United States Patent
Kitahara (10) Patent No.: US 6,545,823 B2
(45) Date of Patent: Apr. 8, 2003

(54) DOUBLE-WAVELENGTH APERTURE RESTRICTING FILTER AND OPTICAL PICKUP APPARATUS USING THE SAME

(75) Inventor: You Kitahara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 6 days.

(21) Appl. No.: 09/986,013

(22) Filed: Nov. 7, 2001

(65) Prior Publication Data

US 2002/0145812 A1 Oct. 10, 2002

(30) Foreign Application Priority Data

Jan. 29, 2001 (JP) .......................... 2001-019943

(51) Int. Cl.$^7$ ........................ G02B 9/00; G02B 27/00; G11B 7/00
(52) U.S. Cl. ................... 359/738; 359/577; 369/44.14; 369/112.22
(58) Field of Search ................ 359/577, 589, 359/738, 724, 722; 369/112.01, 112.03, 112.05, 112.06, 112.08, 112.11, 112.22, 44.14, 44.17, 44.21, 44.22

(56) References Cited

U.S. PATENT DOCUMENTS

6,363,037 B1 * 3/2002 Yamazaki .............. 369/112.26

FOREIGN PATENT DOCUMENTS

JP          10-026726        1/1998

* cited by examiner

Primary Examiner—Scott J. Sugarman
Assistant Examiner—Darryl J. Collins
(74) Attorney, Agent, or Firm—Snider & Associates; Ronald R. Snider

(57) ABSTRACT

A double-wavelength aperture restricting filter has a zonal part adapted to act such that one wavelength $\lambda_1$ of light keeps the quantity of light in an outer peripheral part of the luminous flux thereof whereas the other wavelength $\lambda_2$ of light apparently extinguishes this quantity of light by an interference effect. The zonal part has such a step that light supposed to pass a position corresponding to the zonal part if the zonal part does not exist and light passing a position at which the zonal part is formed if the zonal part exists generate therebetween a phase difference satisfying predetermined conditional expressions, whereas the circle formed by a step boundary has a diameter residing between two luminous flux diameters desired in two systems used for the wavelengths $\lambda_1$ and $\lambda_2$, respectively.

5 Claims, 5 Drawing Sheets

EXAMPLE 1
$\lambda$ =650nm

EXAMPLE 1
$\lambda$ =780nm

FIG.1A
EXAMPLE 1
λ =650nm

FIG.1B
EXAMPLE 1
λ =780nm

FIG.2A
EXAMPLE 1
λ =650nm
STOP DIAMETER 3.66mm

WAVEFRONT ABERRATION (λ)

FIG.2B
EXAMPLE 1
λ =780nm
STOP DIAMETER 3.66mm

WAVEFRONT ABERRATION (λ)

FIG.3A
EXAMPLE 2
λ =650nm

FIG.3B
EXAMPLE 2
λ =780nm

FIG.4A
EXAMPLE 2
λ =650nm
STOP DIAMETER 3.66mm

WAVEFRONT ABERRATION (λ)

FIG.4B
EXAMPLE 2
λ =780nm
STOP DIAMETER 3.66mm

WAVEFRONT ABERRATION (λ)

FIG.5A
EXAMPLE 1
λ=650nm

FIG.5B
EXAMPLE 1
λ=780nm

FIG.6A
EXAMPLE 2
λ=650nm

FIG.6B
EXAMPLE 2
λ=780nm

FIG.7

FIG.8A
CONVENTIONAL
EXAMPLE
λ=650nm NA=0.60

FIG.8B
CONVENTIONAL
EXAMPLE
λ=780nm NA=0.45

FIG.9A
CONVENTIONAL
EXAMPLE
λ=650nm NA=0.60

FIG.9B
CONVENTIONAL
EXAMPLE
λ=780nm NA=0.45 though the display dimensions differ,

DOUBLE-WAVELENGTH APERTURE RESTRICTING FILTER AND OPTICAL PICKUP APPARATUS USING THE SAME

RELATED APPLICATIONS

This application claims the priority of Japanese Patent Application No. 2001-19943 filed on Jan. 29, 2001, which is incorporated herein by reference.

BACKGROUND OF THE INVENTION

1. Field of the Invention

The present invention relates to a double-wavelength aperture restricting filter which, for two systems whose numerical apertures and wavelengths of light in use differ from each other, can pass therethrough the wavelengths of light in use as luminous fluxes corresponding to their respective desirable numerical apertures; and an optical pickup apparatus using the same, which can efficiently converge the respective wavelengths of light in use onto their corresponding optical recording media when recording or reproducing information.

2. Description of the Prior Art

In recent years, various kinds of optical recording media have been under development, and optical pickup apparatus which can carry out recording and reproducing while using a plurality of kinds of optical recording media in common have been known. For example, a system which carries out recording and reproducing of DVD (digital versatile disc) and CD-R (recordable optical disc) by using a single optical pickup apparatus has been known.

In such two kinds of optical recording media, for example, visible light at about 650 nm is used for DVD in order to improve the recording density, whereas near-infrared light at about 780 nm is required to be used for CD-R since it has no sensitivity for light in the visible region. An optical pickup apparatus which can be used in common for both of them is based on so-called dual-wavelength beam type which uses two light beams having wavelengths different from each other as irradiation light. Further, it is necessary for the above-exemplified two optical recording media to have respective numerical apertures different from each other due to differences in characteristics therebetween. For example, DVD and CD-R have respective numerical apertures of 0.6 and 0.45.

Figure 8A:
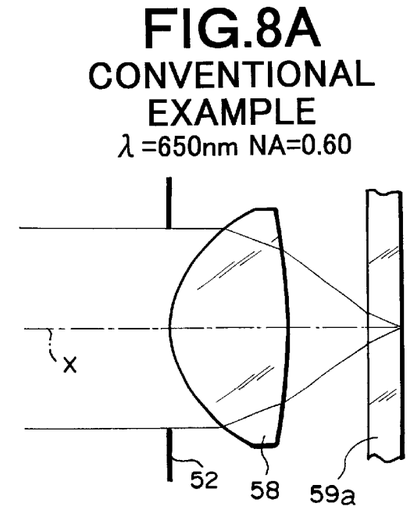
FIGS. 8A and 8B are partial schematic views of a conventional optical pickup apparatus.
Figure 8B:
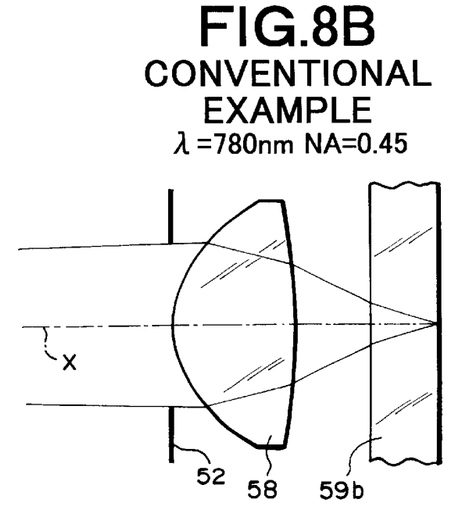

FIGS. 8A and 8B are views schematically showing the foregoing configuration. FIG. 8A shows a case where a DVD 59a is disposed at a predetermined position (on a turntable) so as to carry out its recording/reproducing. It is a system in which a laser beam having a wavelength of 650 nm ($\lambda_1$) in a substantially parallel light state passes through an aperture stop 52 and is converged onto a recording surface of the DVD 59a by an objective lens 58, yielding a numerical aperture of 0.6. FIG. 8B shows a case where a CD-R 59b is disposed at a predetermined position (on a turntable) so as to carry out its recording/reproducing. It is a system in which a laser beam having a wavelength of 780 nm ($\lambda_2$) in a relatively divergent state passes through the aperture stop 52 and is converged onto a recording surface of the CD-R 59b by an objective lens 58, yielding a numerical aperture of 0.45.

Thus, optical pickup apparatus of double-wavelength beam type require means for switching numerical apertures for two systems whose numerical apertures and wavelengths of light in use differ from each other depending on the difference in kinds of optical recording media 59. Known as an example of such means is one using a filter provided with a dichroic coat or using a liquid crystal filter so that its wavelength selectivity changes between the center part and outer peripheral part. Also, for example, there has been a technique in which the aperture stop 52 is formed like a sheet provided with two openings corresponding to respective optical recording media and their corresponding wavelengths of light in use, such that the respective openings are mechanically selected for the individual optical recording media and their corresponding wavelengths of light in use.

When the numerical aperture of the system is adjusted by the above-mentioned liquid crystal shutter or switching technique, the mechanism is likely to become complicated, thus opposing the demands for making the system compact and inexpensive. Known as the above-mentioned dichroic coat is one whose outer peripheral part is processed so as to transmit light having a wavelength of 650 nm therethrough but reflect light having a wavelength of 780 nm. In such a filter, however, there is a fear of the reflected light becoming noise.

SUMMARY OF THE INVENTION

In view of the foregoing circumstances, it is an object of the present invention to provide a double-wavelength aperture restricting filter which, for two systems having respective numerical apertures and wavelengths of light in use different from each other, can pass therethrough the respective wavelengths of light in use as luminous fluxes corresponding to their corresponding desirable numerical apertures by a simple configuration.

It is another object of the present invention to provide an optical pickup apparatus using the same.

The present invention provides a double-wavelength aperture restricting filter comprising a plane-parallel plate having at least one surface provided with a zonal part adapted to act on two wavelengths of light different from each other such that one wavelength $\lambda_1$ of light keeps the quantity of light in an outer peripheral part thereof whereas the other wavelength $\lambda_2$ of light apparently extinguishes the quantity of light in the outer peripheral part by an interference effect;

the zonal part having such a step that light supposed to pass a position corresponding to the zonal part if the zonal part does not exist and light passing a position at which the zonal part is formed if the zonal part exists generate therebetween a phase difference satisfying the following conditional expressions (1) and (2):

$$\Delta_{\lambda 1} = m\lambda_1 + \delta_1 \quad (1)$$

$$\Delta_{\lambda 2} = (2n+1)\lambda_2/2 + \delta_2 \quad (2)$$

where $\Delta_{\lambda 1}$ is the phase difference at the wavelength $\lambda_1$ between the light supposed to pass the position corresponding to the zonal part if the zonal part does not exist and the light passing the position at which the zonal part is formed if the zonal part exists;

$\Delta_{\lambda 2}$ is the phase difference at the wavelength $\lambda_2$ between the light supposed to pass the position corresponding to the zonal part if the zonal part does not exist and the light passing the position at which the zonal part is formed if the zonal part exists;

m and n are integers;

$\delta_1$ is the amount of shift from an integer multiple of the wavelength $\lambda_1$, where $|\delta_1| \leq 0.25\lambda_1$; and $\delta_2$ is the amount of shift from an integer multiple plus a half wavelength of the wavelength $\lambda_2$, where $|\delta_2| \leq 0.25\lambda_2$; and wherein, when the wavelengths $\lambda_1$ and $\lambda_2$ of light are outputted as luminous fluxes having first and second diameters, respectively, a step boundary of the zonal part forms a circle having a diameter residing between the first and second diameters.

Preferably, the double-wavelength aperture restricting filter further satisfies the following conditional expressions (3) and (4):

$$|\delta_1| \leq 0.2\lambda_1 \quad (3)$$

$$|\delta_2| \leq 0.2\lambda_2 \quad (4)$$

The double-wavelength aperture restricting filter may be formed from a plastic material.

In the double-wavelength aperture restricting filter, the wavelength $\lambda_1$ may be 650 nm used for recording/reproducing DVD, whereas the wavelength $\lambda_2$ may be 780 nm used for recording/reproducing CD-R.

The present invention provides an optical pickup apparatus comprising, successively from a light source side, the above-mentioned double-wavelength aperture restricting filter and an objective lens for optical recording media, in which, for a first optical recording medium corresponding to a first numerical aperture and the wavelength $\lambda_1$ of light, and a second optical recording medium corresponding to a second numerical aperture and the wavelength $\lambda_2$ of light, the respective wavelengths of light are converged at desirable positions when recording or reproducing information.

DESCRIPTION OF THE PREFERRED EMBODIMENTS

In the following, embodiments of the present invention will be explained with reference to the drawings.

First, with reference to FIG. 7, an optical pickup apparatus using the double-wavelength aperture restricting filter in accordance with an embodiment of the present invention will be explained.

Figure 7:
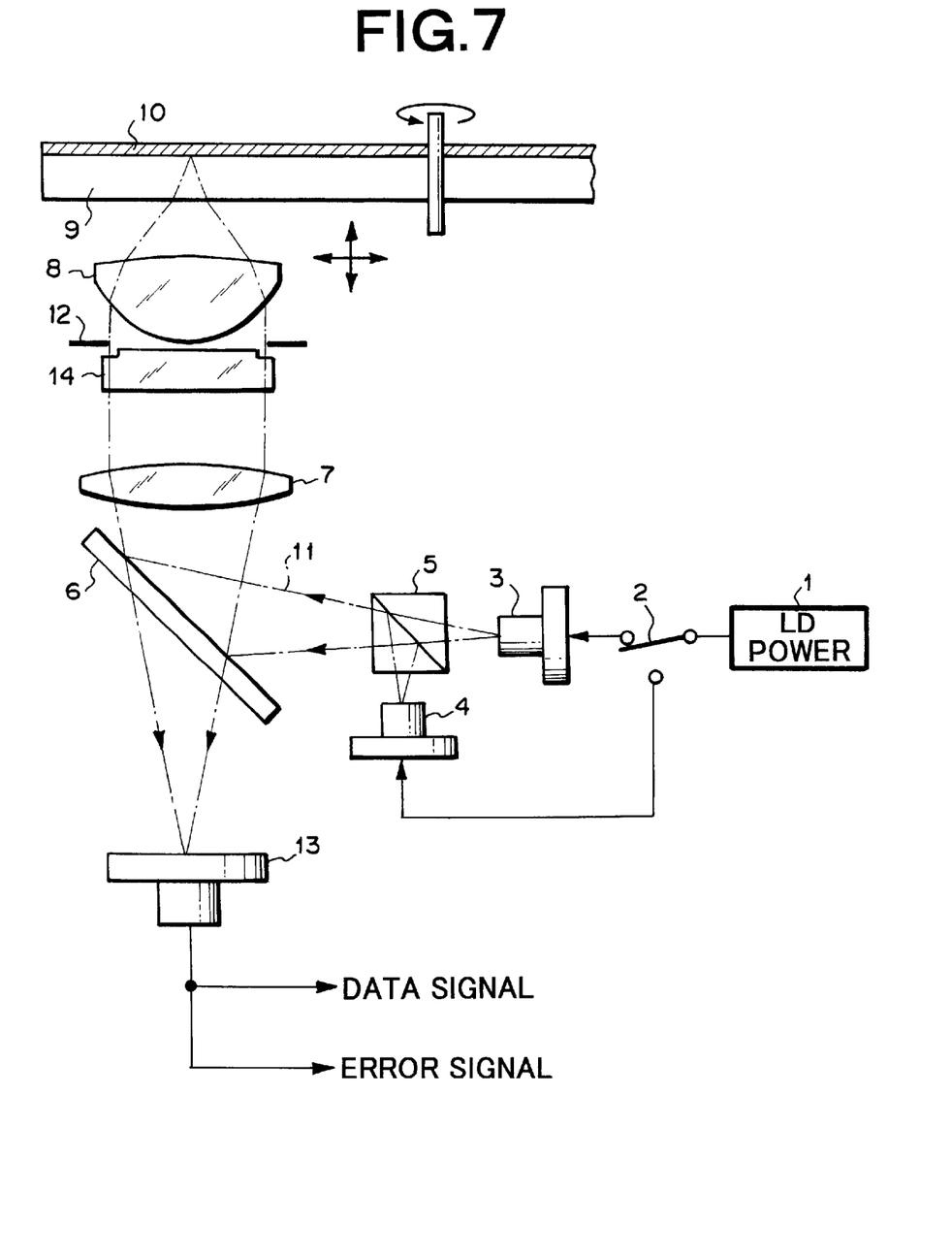
FIG. 7 is a schematic view showing the optical pickup apparatus in accordance with an embodiment of the present invention.

In this optical pickup apparatus, as shown in FIG. 7, a semiconductor laser 3, 4 outputs a laser beam 11 when power is supplied thereto from an LD power source 1, a half mirror 6 reflects the laser beam 11, a collimator lens 7 turns thus reflected laser beam 11 into substantially parallel light, and an objective lens 8 converts the parallel light into convergent light by way of a double-wavelength aperture restricting filter 14, with which a recording region 10 of an optical disc 9 is irradiated. The semiconductor laser 4 is a light source for outputting a laser beam, for example, in a visible region having a wavelength of 650 nm ($\lambda_1$) for DVD (digital versatile disc), whereas the semiconductor laser 3 is a light source for outputting a laser beam in a near-infrared region having a wavelength of about 780 nm ($\lambda_2$) for CD systems such as CD-R (recordable optical disc). The laser beam 11 outputted from one of the semiconductor lasers 3, 4 irradiates the half mirror 6 by way of a prism 5. A changeover switch 2 is disposed between the LD power source 1 and the semiconductor lasers 3, 4. As the changeover switch 2 is operated, power is supplied to one of the semiconductor lasers 3, 4. A stop 12 is disposed between the double-wavelength aperture restricting filter 14 and the objective lens 8.

In the recording region 10, pits carrying signal information are arranged in a track. The reflected light of laser beam 11 from the recording region 10 is made incident on the half mirror 6 by way of the objective lens 8 and collimator lens 7 while carrying the signal information, and is transmitted through the half mirror 6, so as to be made incident on a four-part photodiode 13. The respective quantities of light received at the four separate diode positions are arithmetically operated in this photodiode 13, whereby data signals and respective error signals for focusing and tracking are obtained.

Since the half mirror 6 is inserted in the optical path of the return light from the optical disc 9 in a state tilted by 45°, it acts like a cylindrical lens, so that the light beam transmitted through the half mirror 6 has an astigmatism, whereby the amount of focusing error is determined according to the form of the beam spot of return light on the four-part photodiode 13. Here, the collimator lens 7 can be omitted depending on the circumstances. Also, a grating may be inserted between the semiconductor lasers 3, 4 and the half mirror 6, such that tracking errors can be detected by use of three beams.

Thus, the optical pickup apparatus in accordance with this embodiment is configured such that signals can be recorded and reproduced for any optical disc 9 of CD-R and DVD. Here, each of the CD-R and DVD has a protective sheet made of PC (polycarbonate).

As for the DVD, one having a geometric thickness of 0.6 mm and a refractive index of 1.58 is often used. On the other hand, the geometric thickness of CD-R is standardized at 1.2 mm, and one having a refractive index of 1.55 is often used. Also, these optical discs 9 are used with respective numerical apertures different from each other. In this optical pickup apparatus, light from the light source is transmitted through the double-wavelength aperture restricting filter 14 disposed in front of the objective lens 8, whereby an appropriate numerical aperture can be secured for each of systems using these optical discs 9.

The double-wavelength aperture restricting filter 14 of this embodiment is made of a plane-parallel plate, whose surface on the objective lens side (or on the light source side)

is formed with a zonal part 15 having a level difference with respect to the center portion thereof. The zonal part 15 is formed so as to satisfy the following conditional expressions (1) and (2). For convenience of explanation, the step of the zonal part 15 is exaggerated in FIG. 7.

$$\Delta_{\lambda 1} = m\lambda_1 + \delta_1 \tag{1}$$

$$\Delta_{\lambda 2} = (2n+1)\lambda_2/2 + \delta_2 \tag{2}$$

where $\Delta_{\lambda 1}$ is the phase difference at the wavelength $\lambda_1$ between the light supposed to pass the position corresponding to the zonal part if the zonal part does not exist and the light passing the position at which the zonal part is formed if the zonal part exists;

$\Delta_{\lambda 2}$ is the phase difference at the wavelength $\lambda_2$ between the light supposed to pass the position corresponding to the zonal part if the zonal part does not exist and the light passing the position at which the zonal part is formed if the zonal part exists;

m and n are integers;

$\delta_1$ is the amount of shift from an integer multiple of the wavelength $\lambda_1$, where $|\delta_1| \leq 0.25\lambda_1$; and $\delta_2$ is the amount of shift from an integer multiple plus a half wavelength of the wavelength $\lambda_2$, where $|\delta_2| \leq 0.25\lambda_2$.

Namely, with respect to the wavelength $\lambda_1$ of light, the zonal part 15 acts such that the light passing through the part other than the zonal part 15 and the light passing through the zonal apart 15 yield a phase difference which is an integral multiple of the wavelength $\lambda_1$, so as to cancel the apparent phase difference, thereby keeping the quantity of light as it is in the outer peripheral part of the luminous flux. With respect to the wavelength $\lambda_2$ of light, on the other hand, the zonal part 15 has such a step that the light supposed to pass the position corresponding to the zonal part if the zonal part does not exist and the light passing the position at which the zonal part is formed if the zonal part exists generate a phase difference of (2n+1)×wavelength/2 where n is an integer (as in the following). Therefore, with respect to the wavelength $\lambda_2$ of light, the light passing through the part other than the zonal part 15 and the light passing through the zonal part generate a phase difference which is an odd multiple of ½ wavelength in the outer peripheral part of the luminous flux, thus yielding an interference effect by which these wavelengths of light weaken each other, whereby the quantity of emitted light can be taken as one whose quantity of light is apparently reduced by thus canceled quantity of light. While the fundamental explanation of this action is provided in Teruji Ose, "Feature: Resolution Limit Overcoming Technique Expected for Practice—Ultra Resolution Optical System," O plus E (September 1992), pp. 66–72, it will be explained here in terms of interference of light.

For example, in the case where the wavelength $\lambda_1$ is 650 nm used for DVD whereas the wavelength $\lambda_2$ is 780 nm used for CD systems such as CD-R, the quantity of light is kept as it is in the wavelength light used for DVD but apparently disappears in the outer peripheral portion of the luminous flux in the wavelength light used for CD systems.

Preferably, the above-mentioned $\delta_1$ and $\delta_2$ satisfy the following conditional expressions (3) and (4):

$$|\delta_1| \leq 0.2\lambda_1 \tag{3}$$

$$|\delta_2| \leq 0.2\lambda_2 \tag{4}$$

In order to obtain a luminous flux having a desirable diameter by causing an interference action in light having a Gaussian amplitude distribution, it is not necessary to strictly generate a phase difference at an even multiple of ½ wavelength for the wavelength $\lambda_1$ of light, and a phase difference at an odd multiple of ½ wavelength for the wavelength $\lambda_2$ of light. It is rather preferable for the phase differences to shift slightly in view of aberration occurring in the lens and the like. Preferably, the amount of shift is about 20%.

The diameter of the circle formed by the step boundary between the center part of the filter 14 and the zonal part 15 is preferably set so as to reside between the respective luminous flux diameters corresponding to the numerical apertures required by the systems for the above-mentioned wavelengths. For example, letting $R_1$ be the radius of the luminous flux transmitted through the filter 14 in response to the numerical aperture (0.6) of the system corresponding to the wavelength $\lambda_1$ used for DVD, and $R_2$ be the radius of the luminous flux transmitted through the filter 14 in response to the numerical aperture (0.45) of the system corresponding to the wavelength $\lambda_1$ used for CD systems such as CD-R, the boundary of the zonal part 15 is preferably set such that its radius resides between the radii $R_2$ and $R_1$. Further, letting $R_x$ be the radius of the boundary at this time, the radius $R_x$ is preferably located at a position where the area of a doughnut-shaped portion whose diameter ranges from $R_2$ to $R_1$ in the zonal part 15 is divided into two equal parts. Namely, $\pi R_1^2 - \pi R_x^2 = \pi R_x^2 - \pi R_2^2$, whereby the radius $R_x$ at the boundary position of the zonal part becomes $[(R_1^2 + R_2^2) \times \frac{1}{2}]^{1/2}$.

When the radius $R_x$ of the boundary position of the zonal part is thus set so that the outer periphery side thereof becomes the zonal part 15, no apparent phase difference occurs at the wavelength of 650 nm ($\lambda_1$) between the light passing through the zonal part 15 and the light passing through the center part, so that the luminous flux passing through the filter 14 is not narrowed, whereby the numerical aperture (0.6) of the system can be obtained. At the wavelength of 780 nm ($\lambda_2$), the light passing through the zonal part 15 and the light passing through the part located on the side nearer to the center part than is the zonal part 15 generate a phase difference which is an odd multiple of ½ wavelength, so as to interfere with each other, thereby apparently canceling the quantity of light in the outer peripheral part of the luminous flux, thus allowing the system to have a numerical aperture of about 0.45.

The zonal part may be a recessed or protruded zone having an outer boundary, other than the boundary with respect to the center part, located on the outer side of the position corresponding to the greater numerical aperture in the two numerical apertures desired in the system. Alternatively, it may be such a zone that no outer boundary position exists up to the edge face of the filter 14.

When the double-wavelength aperture restricting filter 14 equipped with such a zonal part 15 is provided in the case where the DVD is disposed at a predetermined position (on a turntable) for recording/reproducing, the laser beam 11 having a wavelength of 650 nm ($\lambda_1$) from the semiconductor laser 4 is turned into substantially parallel light by the collimator lens 7 and, in this state, made incident on the filter 14. Here, without being influenced by whether the zonal part 15 exists or not, the numerical aperture of the system becomes 0.6, whereby the incident laser beam 11 is converged onto the recording surface of DVD by the objective lens 8.

In the case where the CD-R (CD system) is disposed at a predetermined position (on the turntable) for recording or reproducing, the laser beam 11 having a wavelength of 780 nm ($\lambda_2$) from the semiconductor laser 3 disposed at a position shifted from the focal position of the collimator lens 7 is made incident on the double-wavelength aperture restricting filter 14 while in a relatively diverged state. Here, the luminous flux in the outer peripheral portion of the incident laser beam 11 is apparently canceled by the zonal part 15 due to the interference effect, so that the numerical aperture of the system becomes about 0.45, whereby the laser beam 11 is converged onto the recording surface of CD-R (CD system) by the objective lens 8.

The stop 12 shown in FIG. 7 is not always necessary in this embodiment, and does not act so as to switch respective numerical apertures desired for two different wavelengths of light as in the conventional example.

As explained in the foregoing, without using any complicated mechanism, the double-wavelength aperture restricting filter in accordance with this embodiment can yield respective luminous fluxes corresponding to predetermined numerical apertures for wavelengths different from each other. Namely, it has a clearly simpler configuration and can achieve compactness and lower cost as compared with those adjusting the numerical aperture by using liquid crystal shutters and switching systems. Also, it can prevent reflected light from occurring, which has been problematic in filters provided with a dichroic coat. Further, since a step is formed between the outer peripheral part and center part of a plane-parallel plate, the double-wavelength aperture restricting filter of the present invention is advantageous in that it is relatively easy to process, its tolerance is wider, and its manufacturability is favorable.

Therefore, when the double-wavelength aperture restricting filter in accordance with this embodiment is employed in an optical pickup apparatus, the apparatus can be made compact at a lower cost. Also, noise can be prevented from occurring due to the reflected light returning to the laser light source or entering the photodetector.

While Japanese Unexamined Patent Publication No. 10-26726 discloses an aberration-correcting optical device provided with a zonal part on its surface on the light source side, it is an aberration-correcting optical device for an optical pickup to be used with a single-wavelength light source. Also, the optical system disclosed in the above-mentioned publication is aimed at lowering the large wavefront aberration occurring when an optical system for DVD is used for CD systems. Namely, the optical system disclosed in the above-mentioned publication does not support double-wavelength light sources.

EXAMPLES

The double-wavelength aperture restricting filter in accordance with the present invention and the optical pickup apparatus using the same will now be explained specifically with reference to Examples.

Example 1

Figure 1A:
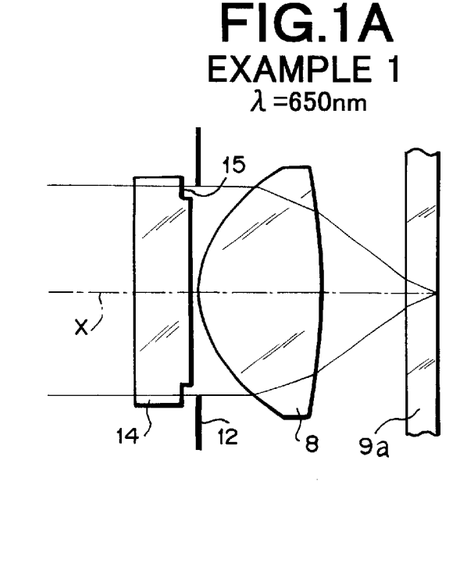
FIGS. 1A and 1B are partial schematic views showing an optical pickup apparatus comprising the double-wavelength aperture restricting filter in accordance with Example 1.
Figure 1B:
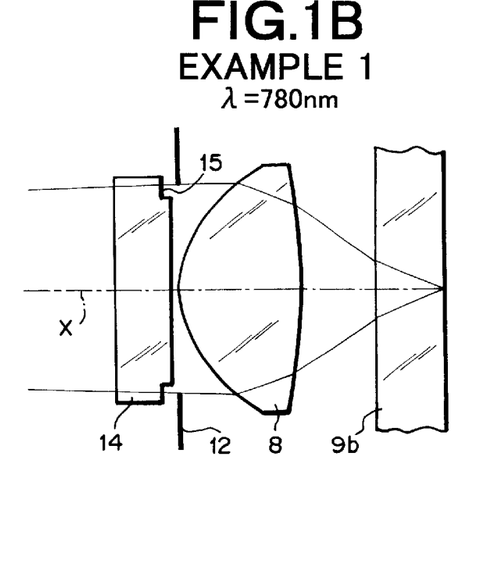

FIGS. 1A and 1B are schematic views showing an optical pickup apparatus equipped with the double-wavelength aperture restricting filter in accordance with Example 1, while enlarging its part from the double-wavelength aperture restricting filter 14 to the optical disc 9. As shown in FIGS. 1A and 1B, the double-wavelength aperture restricting filter 14 in accordance with Example 1 has a zonal part 15, depressed on the objective lens side, in the outer peripheral portion of the surface on the objective lens side. For convenience of explanation, the step is exaggerated in FIGS. 1A and 1B (as in FIGS. 3A and 3B). In these drawings, X indicates the optical axis (as in FIGS. 3A and 3B and FIGS. 8A and 8B).

In the case where a DVD 9a is disposed at a predetermined position (on a turntable) for recording/reproducing as shown in FIG. 1A, a laser beam having a wavelength of 650 nm ($\lambda_1$) is made incident on the filter 14 while in a substantially parallel light state. Here, without being influenced by whether the zonal part 15 exists or not, the numerical aperture of the system becomes 0.6, whereby the incident laser beam passes through the stop 12 and is converged onto the recording surface of DVD 9a by the objective lens 8.

In the case where a CD-R 9b is disposed at a predetermined position (on the turntable) for recording or reproducing as shown in FIG. 1B, a laser beam having a wavelength of 780 nm ($\lambda_2$) is made incident on the filter 14 while in a relatively diverged state. Here, the luminous flux in the outer peripheral portion of the incident laser beam is apparently canceled by the zonal part 15 due to the interference effect, so that the numerical aperture of the system becomes about 0.45, whereby the laser beam is transmitted through the stop 12 and is converged onto the recording surface of CD-R 9b by the objective lens 8.

Both faces of the objective lens 8 in accordance with Example 1 are aspheric surfaces represented by the following aspheric surface expression:

$$X(Y) = \frac{Y^2}{R(1+\sqrt{1-KY^2/R^2})} + \sum_{i=2}^{5} A_i Y^{2i}$$

where

X(Y) is the length of the perpendicular to a tangential plane (plane perpendicular to the optical axis) of an apex of the aspheric surface from a point on the aspheric surface having a distance Y from the optical axis;

Y is the distance from the optical axis;

$A_i$ is the aspheric surface coefficient (i=2 to 5);

R is the radius of curvature of the aspheric surface near the optical axis; and

K is the eccentricity.

The following Table 1 shows data (radii of curvature R, surface spaces D in the cases where $\lambda$=650 nm and 780 nm, and refractive indices N in the cases where $\lambda$=650 nm and 780 nm) in the part ranging from the double-wavelength aperture restricting filter 14 in accordance with Example 1 to the optical disc 9. The following Table 2 shows thickness data of the double-wavelength aperture restricting filter 14 formed with the zonal part 15, diameters of the stop 12, light source positions (distances from the surface of the filter on the light source side to the light source) when $\lambda$=650 nm and 780 nm, and aspheric surface coefficients of each aspheric surface in the objective lens 8 in accordance with Example 1. In Table 2, the light source position at infinity indicates that the incident luminous flux is a parallel luminous flux (as in the following Tables 3 and 4).

Figure 2A:
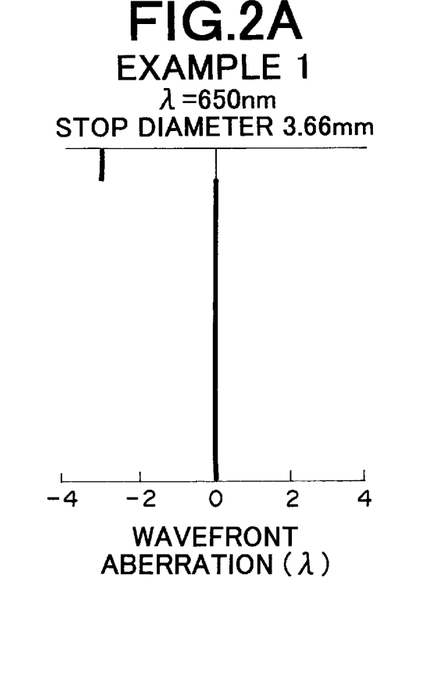
FIGS. 2A and 2B are wavefront aberration charts of the optical pickup apparatus comprising the double-wavelength aperture restricting filter in accordance with Example 1.
Figure 2B:
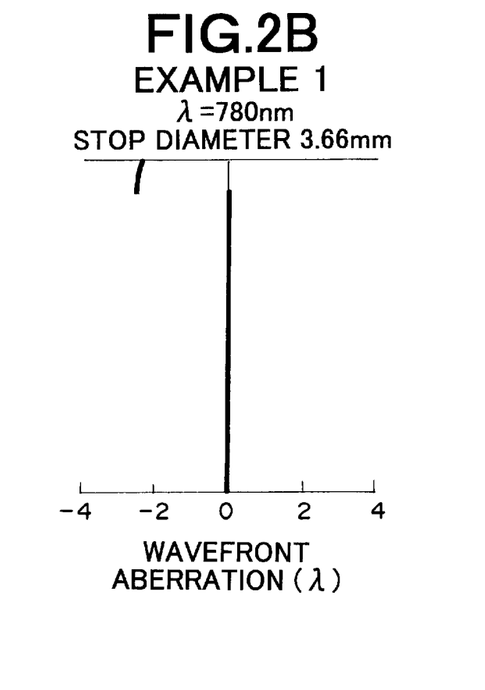

FIGS. 2A and 2B show wavefront aberration charts of the optical pickup apparatus equipped with the double-wavelength aperture restricting filter 14 in accordance with Example 1, concerning light at wavelengths of 650 nm and 780 nm, respectively. As can be seen from these wavefront aberration charts, a predetermined phase difference is generated at the boundary position between the center part and zonal part 15 in the double-wavelength aperture restricting filter in accordance with Example 1 when the latter is used for any of the systems where $\lambda$=650 nm and 780 nm.

Example 2

Figure 3A:
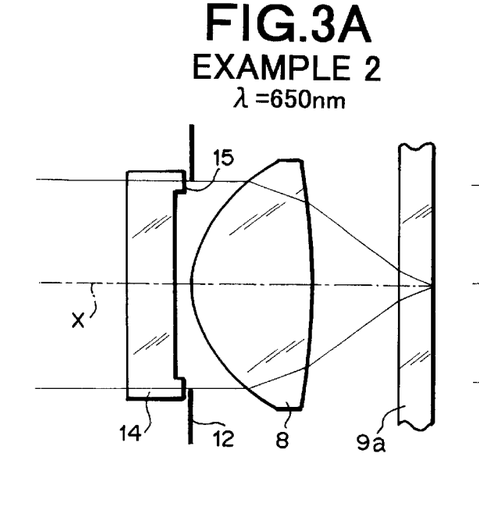
FIGS. 3A and 3B are partial schematic views showing an optical pickup apparatus comprising the double-wavelength aperture restricting filter in accordance with Example 2.
Figure 3B:
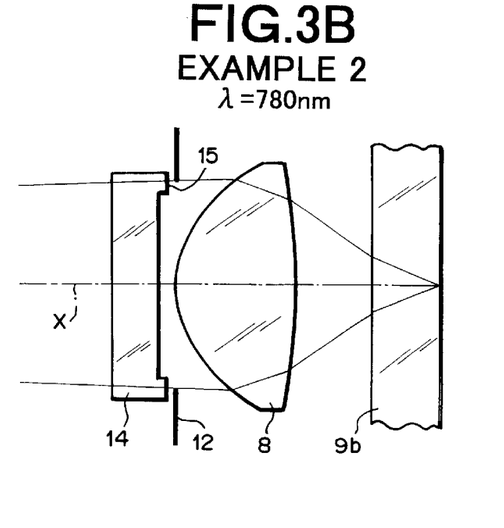

FIGS. 3A and 3B are schematic views showing an optical pickup apparatus equipped with the double-wavelength aperture restricting filter in accordance with Example 2, while enlarging its part from the double-wavelength aperture restricting filter 14 to the optical disc 9. As shown in FIGS. 3A and 3B, the double-wavelength aperture restricting filter 14 in accordance with Example 2 has a zonal part 15, protruded on the objective lens side, in the outer peripheral portion of the surface on the objective lens side. This apparatus uses the same objective lens 8 as that used in Example 1.

In the case where a DVD 9a is disposed at a predetermined position (on a turntable) for recording/reproducing as shown in FIG. 3A, a laser beam having a wavelength of 650 nm ($\lambda_1$) is made incident on the filter 14 while in a substantially parallel light state. Here, without being influenced by whether the zonal part 15 exists or not, the numerical aperture of the system becomes 0.6, whereby the incident laser beam passes through the stop 12 and is converged onto the recording surface of DVD 9a by the objective lens 8.

In the case where a CD-R 9b is disposed at a predetermined position (on the turntable) for recording or reproducing as shown in FIG. 3B, a laser beam having a wavelength of 780 nm ($\lambda_2$) is made incident on the filter 14 while in a relatively diverged state. Here, the luminous flux in the outer peripheral portion of the incident laser beam is apparently canceled by the zonal part 15 due to the interference effect, so that the numerical aperture of the system becomes about 0.45, whereby the laser beam passes through the stop 12 and is converged onto the recording surface of CD-R 9b by the objective lens 8.

The following Table 3 shows data (radii of curvature R, surface spaces D in the cases where $\lambda$=650 nm and 780 nm, and refractive indices N in the cases where $\lambda$=650 nm and 780 nm) in the part ranging from the double-wavelength aperture restricting filter 14 in accordance with Example 2 to the optical disc 9, thickness data of the double-wavelength aperture restricting filter 14 formed with the zonal part 15, diameters of the stop 12, and light source positions (distances from the surface of the filter on the light source side to the light source) when $\lambda$=650 nm and 780 nm.

Figure 4A:
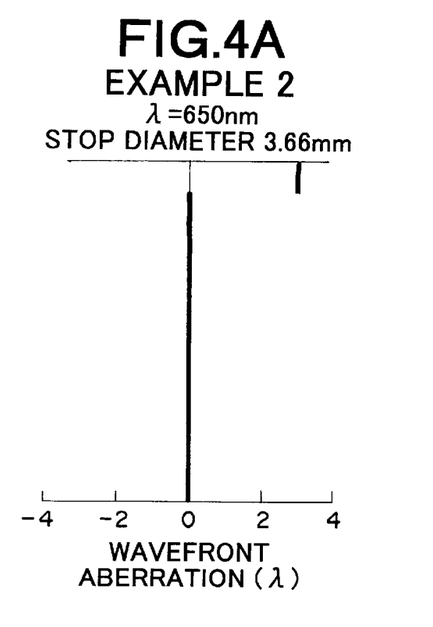
FIGS. 4A and 4B are wavefront aberration charts of the optical pickup apparatus comprising the double-wavelength aperture restricting filter in accordance with Example 2.
Figure 4B:
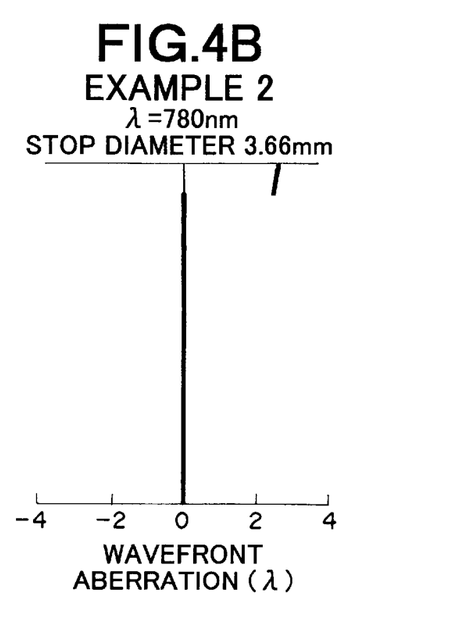

FIGS. 4A and 4B show wavefront aberration charts of the optical pickup apparatus equipped with the double-wavelength aperture restricting filter 14 in accordance with Example 2, concerning light at wavelengths of 650 nm and 780 nm, respectively. As can be seen from these wavefront aberration charts, a predetermined phase difference is generated at the boundary position between the center part and zonal part 15 in the double-wavelength aperture restricting filter in accordance with Example 2 when the latter is used for any of the systems where $\lambda$=650 nm and 780 nm.

For comparison with the double-wavelength aperture restricting filter in accordance with the present invention, data obtained when the numerical aperture is adjusted by the aperture stop 52 as shown in FIGS. 8A and 8B will be shown. This conventional example uses the same objective lens 8 as that used in Examples 1 and 2. The following Table 4 shows data (radius of curvature R, surface spaces D in the cases where $\lambda$=650 nm and 780 nm, and refractive indices N in the cases where $\lambda$=650 nm and 780 nm) in the part ranging from the objective lens 58 in accordance with this conventional example to the optical disc 59, diameters of the stop 52, and light source positions (distances from the surface of the lens on the light source side to the light source) when $\lambda$=650 nm and 780 nm.

Figure 5A:
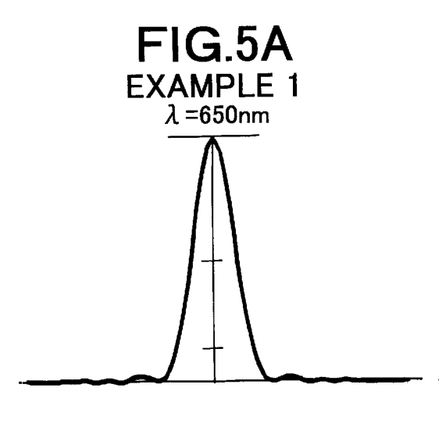
FIGS. 5A and 5B are beam profiles of light collected by the optical pickup apparatus comprising the double-wavelength aperture restricting filter in accordance with Example 1.
Figure 5B:
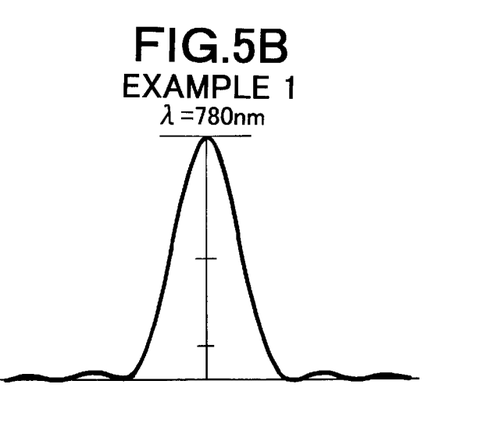
Figure 6A:
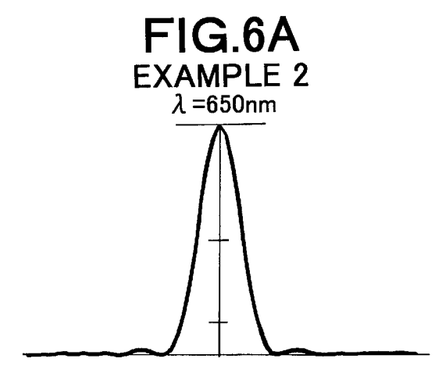
FIGS. 6A and 6B are beam profiles of light collected by the optical pickup apparatus comprising the double-wavelength aperture restricting filter in accordance with Example 2.
Figure 6B:
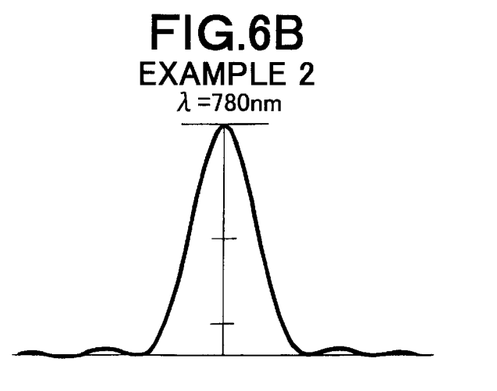
Figure 9A:
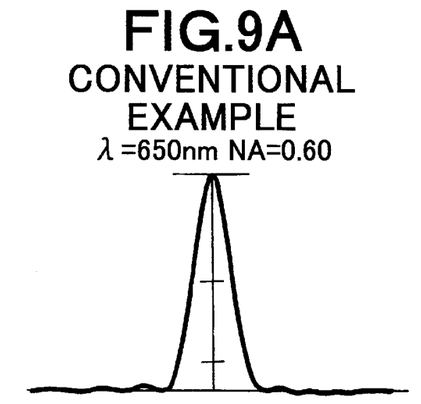
FIGS. 9A and 9B are beam profiles of light collected by the conventional optical pickup apparatus.
Figure 9B:
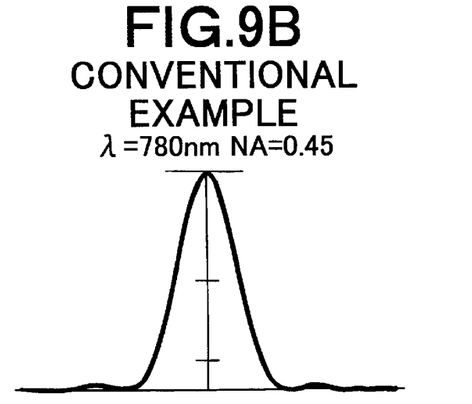

FIGS. 9A and 9B show beam profiles of light collected by the conventional optical pickup apparatus using a numerical aperture; whereas FIGS. 5A and 5B and FIGS. 6A and 6B show beam profiles of light collected by the optical pickup apparatus equipped with the double-wavelength aperture restricting filters in accordance with the above-mentioned Examples 1 and 2, respectively. FIGS. 5A, 6A, and 9A show beam profiles obtained when light having a wavelength of 650 nm is collected; whereas FIGS. 5B, 6B, and 9B show beam profiles obtained when light having a wavelength of 780 nm is collected. As can be seen from FIGS. 5A and 5B, 6A and 6B, and 9A and 9B, beam profiles substantially the same as those obtained in the conventional pickup apparatus provided with an aperture stop so as to attain an NA of 0.6 or 0.45 can be obtained when the double-wavelength aperture restricting filters in accordance with the above-mentioned Examples 1 and 2 are used, though they are apparatus with a simpler configuration.

The double-wavelength aperture restricting filter in accordance with the present invention is not restricted to that of the above-mentioned embodiment, and can be modified in various manners. For example, the filter can be formed from a plastic material.

Though the filter surface on the objective lens side is provided with a zonal part in Examples, the lens surface on the light source side may be provided with a zonal part, and both surfaces may be provided with zonal parts so as to yield a predetermined amount of thickness difference in the filter in total. However, forming a zonal part on only one of the surfaces is advantageous in terms of processability.

The double-wavelength aperture restricting filter in accordance with the present invention is usable not only with the objective lens used in Examples but also in combination with objective lenses for other pickup apparatus. In such a case, the degree of freedom in combination is high since the filter of the present invention itself has a function by which, for two systems whose respective numerical apertures and wavelengths of light in use differ from each other, the respective wavelengths of light in use can be transmitted therethrough as luminous fluxes corresponding to desirable numerical apertures.

Though wavelengths of 650 nm and 780 nm are used in combination in the explanation of the embodiment, the double-wavelength aperture restricting filter of the present invention is not restricted to this combination of wavelengths, whereby other two kinds of wavelengths different from each other may also be used in combination. For example, the present invention is applicable to optical systems in which, even at the same disc thickness, wavelengths are different from each other as a condition for use, so that the NA of light has to be changed. Also, the desirable numerical aperture is not restricted to the combination of 0.6 and 0.45.

The optical recording media subjected to recording/reproducing in the optical pickup apparatus of the present invention are not restricted to DVD and CD-R (CD systems). The present invention is applicable to any of cases where two optical recording media whose specs differ from each other in terms of the wavelength in use and numerical aperture are recorded/reproduced by a common optical pickup apparatus.

Though the above-mentioned Examples show cases where the light at a wavelength of 650 nm is turned into parallel light whereas light at a wavelength of 780 nm is turned into divergent light, they are not restrictive, whereby the apparent numerical aperture NA can be changed with respect to one of the wavelengths of light.

Though the optical pickup apparatus in accordance with the above-mentioned embodiment is equipped with respective light sources for outputting wavelengths of light different from each other, it may be equipped with a single light source capable of outputting two wavelengths of light different from each other.

As explained in the foregoing, the double-wavelength aperture restricting filter of the present invention has at least one surface provided with a zonal part adapted to act such that one wavelength $\lambda_1$ of light keeps the quantity of light in an outer peripheral part of the luminous flux thereof whereas the other wavelength $\lambda_2$ of light apparently extinguishes this quantity of light by an interference effect. With such a simple configuration, this double-wavelength aperture restricting filter can transmit therethrough, for two systems whose respective numerical apertures and wavelengths of light in use differ from each other, the respective wavelengths of light as luminous fluxes corresponding to their desirable numerical apertures. Therefore, the present invention makes it possible to provide a compact, low-cost double-wavelength aperture restricting filter having a favorable manufacturability, and an optical pickup apparatus using the same.

TABLE 1

| Surface | Radius of curvature (R) | Surface space (D) $\lambda$ = 650 nm | $\lambda$ = 780 nm | Refractive index (N) $\lambda$ = 650 nm | $\lambda$ = 780 nm |
|---|---|---|---|---|---|
| 1 | ∞ | 1.00000 | 1.00000 | 1.52270 | 1.51921 |
| 2 | ∞ | 0.10000 | 0.10000 | 1.00000 | 1.00000 |
| 3 | 1.90071 | 2.15000 | 2.15000 | 1.52270 | 1.51921 |
| 4 | −6.04803 | 1.48600 | 1.30000 | 1.00000 | 1.00000 |
| 5 | ∞ | 0.60000 | 1.20000 | 1.58000 | 1.55000 |
| 6 | ∞ | | | | |

The first and second surfaces are filter surfaces, the third and fourth surfaces are lens surfaces (both faces being aspheric surfaces), and the fifth and sixth surfaces are disc surfaces.

The surface space and refractive index shown in the k-th surface refer to the surface space and refractive index in the area ranging from the k-th surface to the (k+1)-th surface.

When a lens surface is an aspheric surface, the radius of curvature (R) indicates the radius of curvature near the optical axis.

TABLE 2

Filter thickness

| | |
|---|---|
| Area up to a diameter of 3.326 mm centered at the optical axis | 1.00000 mm |
| Area outside of the diameter of 3.326 mm centered at the optical axis | 0.99621 mm |

Stop diameter and light source position

| | $\lambda$ = 650 nm | $\lambda$ = 780 nm |
|---|---|---|
| Stop diameter | 3.66 mm | 3.66 mm |
| Light source position | ∞ | −51.11 mm |

| Aspheric surface coefficient | 3$^{rd}$ surface | 4$^{th}$ surface |
|---|---|---|
| | $A_2$ = 8.823129 × 10$^{-3}$ | $A_2$ = 2.404108 × 10$^{-2}$ |
| | $A_3$ = 5.137300 × 10$^{-4}$ | $A_3$ = −6.667989 × 10$^{-3}$ |
| | $A_4$ = 9.149332 × 10$^{-5}$ | $A_4$ = 1.030167 × 10$^{-3}$ |
| | $A_5$ = −2.180800 × 10$^{-5}$ | $A_5$ = −6.529124 × 10$^{-5}$ |
| | K = 0.0 | K = 0.0 |

TABLE 3

| Surface | Radius of curvature (R) | Surface space (D) $\lambda$ = 650 nm | $\lambda$ = 780 nm | Refractive index (N) $\lambda$ = 650 nm | $\lambda$ = 780 nm |
|---|---|---|---|---|---|
| 1 | ∞ | 1.00000 | 1.00000 | 1.52270 | 1.51921 |
| 2 | ∞ | 0.10000 | 0.10000 | 1.00000 | 1.00000 |
| 3 | 1.90071 | 2.15000 | 2.15000 | 1.52270 | 1.51921 |
| 4 | −6.04803 | 1.48600 | 1.30000 | 1.00000 | 1.00000 |
| 5 | ∞ | 0.60000 | 1.20000 | 1.58000 | 1.55000 |
| 6 | ∞ | | | | |

The first and second surfaces are filter surfaces, the third and fourth surfaces are lens surfaces (both faces being aspheric surfaces), and the fifth and sixth surfaces are disc surfaces.

The surface space and refractive index shown in the k-th surface refer to the surface space and refractive index in the area ranging from the k-th surface to the (k+1)-th surface.

When a lens surface is an aspheric surface, the radius of curvature (R) indicates the radius of curvature near the optical axis.

Filter thickness

| | |
|---|---|
| Area up to a diameter of 3.326 mm centered at the optical axis | 1.00000 mm |
| Area outside of the diameter of 3.326 mm centered at the optical axis | 1.00379 mm |

Stop diameter and light source position

| | $\lambda$ = 650 nm | $\lambda$ = 780 nm |
|---|---|---|
| Stop diameter | 3.66 mm | 3.66 mm |
| Light source position | ∞ | −51.11 mm |

TABLE 4

| Surface | Radius of curvature (R) | Surface space (D) $\lambda$ = 650 nm | $\lambda$ = 780 nm | Refractive index (N) $\lambda$ = 650 nm | $\lambda$ = 780 nm |
|---|---|---|---|---|---|
| 1 | 1.90071 | 2.15000 | 2.15000 | 1.52270 | 1.51921 |
| 2 | −6.04803 | 1.48600 | 1.30000 | 1.00000 | 1.00000 |
| 3 | ∞ | 0.60000 | 1.20000 | 1.58000 | 1.55000 |
| 4 | ∞ | | | | |

The first and second surfaces are lens surfaces (both faces being aspheric surfaces), and the third and fourth surfaces are disc surfaces.

The surface space and refractive index shown in the k-th surface refer to the surface space and refractive index in the area ranging from the k-th surface to the (k+1)-th surface.

When a lens surface is an aspheric surface, the radius of curvature (R) indicates the radius of curvature near the optical axis.

| Stop diameter and light source position | | |
|---|---|---|
| | λ = 650 nm | λ = 780 nm |
| NA | 0.60 | 0.45 |
| Stop diameter | 3.66 mm | 2.91 mm |
| Light source position | ∞ | −51.87 mm |

What is claimed is:

1. A double-wavelength aperture restricting filter comprising a plane-parallel plate having at least one surface provided with a zonal part adapted to act on two wavelengths of light different from each other such that one wavelength $\lambda_1$ of light keeps the quantity of light in an outer peripheral part thereof whereas the other wavelength $\lambda_2$ of light apparently extinguishes the quantity of light in said outer peripheral part by an interference effect;

said zonal part having such a step that light supposed to pass a position corresponding to said zonal part if said zonal part does not exist and light passing a position at which said zonal part is formed if said zonal part exists generate therebetween a phase difference satisfying the following conditional expressions (1) and (2):

$$\Delta_{\lambda 1} = m\lambda_1 + \delta_1 \quad (1)$$

$$\Delta_{\lambda 2} = (2n+1)\lambda_2/2 + \delta_2 \quad (2)$$

where $\Delta_{\lambda 1}$ is the phase difference at the wavelength $\lambda_1$ between the light supposed to pass the position corresponding to said zonal part if said zonal part does not exist and the light passing the position at which said zonal part is formed if said zonal part exists;

$\Delta_{\lambda 2}$ is the phase difference at the wavelength $\lambda_2$ between the light supposed to pass the position corresponding to said zonal part if said zonal part does not exist and the light passing the position at which said zonal part is formed if said zonal part exists;

m and n are integers;

$\delta_1$ is the amount of shift from an integer multiple of the wavelength $\lambda_1$, where $|\delta_1| \leq 0.25\lambda_1$; and $\delta_2$ is the amount of shift from an integer multiple plus a half wavelength of the wavelength $\lambda_2$, where $|\delta_2| \leq 0.25\lambda_2$; and wherein, when the wavelengths $\lambda_1$ and $\lambda_2$ of light are outputted as luminous fluxes having first and second diameters, respectively, a step boundary of said zonal part forms a circle having a diameter residing between said first and second diameters.

2. A double-wavelength aperture restricting filter according to claim 1, further satisfying the following conditional expressions (3) and (4):

$$|\delta_1| \leq 0.2\lambda_1 \quad (3)$$

$$|\delta_2| \leq 0.2\lambda_2 \quad (4).$$

3. A double-wavelength aperture restricting filter according to claim 1, wherein said filter is formed from a plastic material.

4. A double-wavelength aperture restricting filter according to claim 1, wherein said wavelength $\lambda_1$ is 650 nm used for recording/reproducing DVD, and wherein said wavelength $\lambda_2$ is 780 nm used for recording/reproducing CD-R.

5. An optical pickup apparatus comprising, successively from a light source side, the double-wavelength aperture restricting filter according to claim 1 and an objective lens for optical recording media; wherein, for a first optical recording medium corresponding to a first numerical aperture and said wavelength $\lambda_1$ of light, and a second optical recording medium corresponding to a second numerical aperture and said wavelength $\lambda_2$ of light, the respective wavelengths of light are converged at desirable positions when recording or reproducing information.

* * * * *